No. 619,356. Patented Feb. 14, 1899.
C. H. SHANNON.
HINGE.
(Application filed Aug. 4, 1898.)
(No Model.)
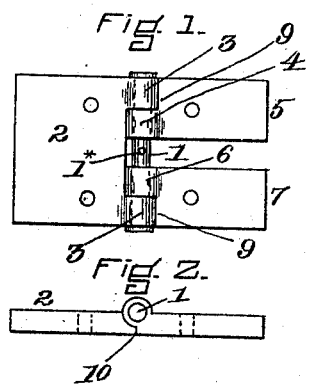
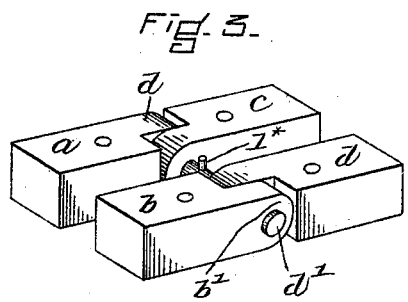
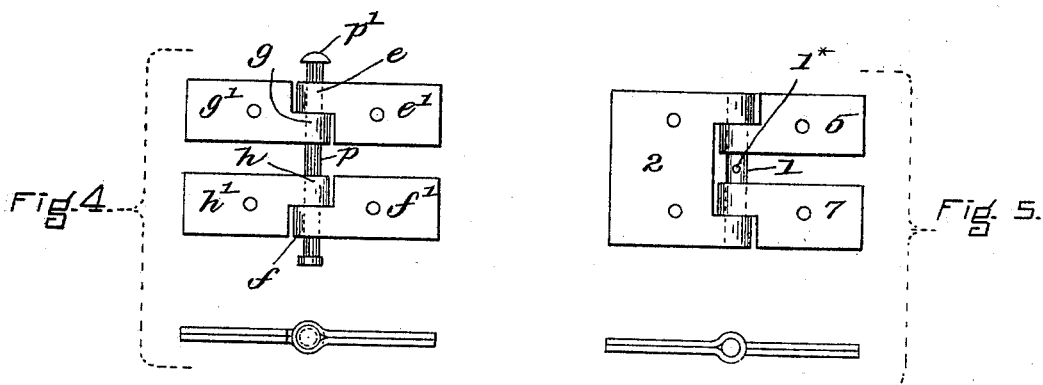
WITNESSES.
A. D. Brown.
Fred E. Dorr.
INVENTOR.
Charles H. Shannon
by Edward S. Beach
his Atty.

UNITED STATES PATENT OFFICE.

CHARLES H. SHANNON, OF BROCKTON, MASSACHUSETTS, ASSIGNOR TO THE TYLER HINGED LAST COMPANY, OF SAME PLACE.

HINGE.

SPECIFICATION forming part of Letters Patent No. 619,356, dated February 14, 1899.

Application filed August 4, 1898. Serial No. 687,690. (No model.)

*To all whom it may concern:*

Be it known that I, CHARLES H. SHANNON, a citizen of the United States, residing at Brockton, in the county of Plymouth and State of Massachusetts, have invented a certain new and useful Improvement in Hinges, of which the following is a specification.

Figure 1 is a top plan view, and Fig. 2 an edge view, of a hinge embodying my invention. Figs. 3, 4, and 5 are top plan views of modifications.

The object of my invention is to produce a hinge having leaves or analogous members which are movable edgewise on the pintle to permit lateral movement of attached parts in addition to the usual swinging movement incident to the leaf of analogous hinges.

In the drawings illustrating the principle of my invention and the best mode now known to me of applying that principle, 1 is the pintle, and 2 a leaf loosely mounted thereon. Leaf 2 is provided at its inner end with pintle-receiving ears 3 3, one ear 3 being at one side and the other ear being at the other side of leaf 2, with a space between them for the reception of the ear 4 of leaf 5 and ear 6 of leaf 7, the total width of both ears 4 and 6 being less than the distance between the ears 3 3, so that each leaf 5 and 6 may be moved edgewise on the pintle between the ears 3 3, the pintle passing through these ears and the intermediate ears 4 and 6.

It will be seen that when the three leaves 2, 5, and 7 are attached separately to three distinct things, the things attached to leaves 5 and 7 may be moved from and toward each other or be swung together or separately toward or from the thing to which leaf 2 is attached, and of course the thing attached to leaf 2 may be swung toward or from the things attached to the leaves 5 and 7. The leaves above mentioned are made from sheet metal bent upon itself to form the pintle-receiving ears 3 3, 4, and 5; but the leaves may be of any other desired construction, form, or material. The leaves are shown provided with the ordinary pin-holes 8, but may be made without them or with or without holding projections for their flat sides, as will be plain to all skilled in the art. To give greater width and consequent strength to the leaves 5 and 7, they are each made with an offset 9 on the outer side of the outer line of the ears 4 and 5; but such form or configuration is not essential to my invention.

In the preferred form of hinge embodying my invention the leaves are formed at one side of the pintle and at their inner ends with transverse shoulders or abutments 10, which contact or abut when the leaves are in extended position, and thereby prevent the hinge from being bent backwardly to a greater extent than desired. I show these shoulders at right angles to the lengthwise plane of the hinge; but they may be shaped in any way desired to arrest backward movement before or after the hinge-leaves are brought into alinement—that is, into a straight line.

In Fig. 3, showing a modification, the leaves $a\ b\ c\ d$ are of bar-like form, all faced leaves being loosely mounted on the pintle $d'$ and leaves $c$ and $d$ being movable from and toward each other between the ears $a'\ b'$ of leaf $a$.

In Fig. 4, showing another modification, the pintle $p$ is longer than the greatest width of the hinge and has at each end a head $p'$ of larger diameter than the cross-area of the pintle-receiving ears $e$, $f$, $g$, and $h$, which are respectively at the inner ends of the leaves $e'$, $f'$, $g'$, and $h'$. The leaves $e'$ and $f'$ are on one side of the pintle and the leaves $g'$ and $h'$ on the other side thereof, the leaves $e'$ and $f'$ being edgewise movable from and toward each other on the pintle, and so are the leaves $g'$ and $h'$. All the leaves are free to swing on the pintle.

In Fig. 5, showing another modification, the hinge is the same construction as that shown in Figs. 1 and 2, except that the leaves are not provided on their rear sides with transverse shoulders or abutments, which contact when the leaves are in adjustment or otherwise extended.

The uses to which my new hinge may be put are numerous. The particular use to which I have already put it is in the three parts last set forth in the joint application of Abel D. Tyler, Jr., and myself of even date herewith.

What I claim is—

1. As a new article of manufacture, a hinge comprising a plurality of leaves and a connecting-pintle, one leaf being formed with a plurality of pintle-receiving ears, at its inner end; and a plurality of edgewise-movable leaves being mounted on said pintle.

2. As a new article of manufacture, a hinge comprising a plurality of leaves and a connecting-pintle; one leaf being movable, on the pintle, edgewise in relation to another leaf on the pintle, said leaves having, at one side of the pintle, and at their inner ends, transverse shoulders which abut when the leaves are extended.

In testimony whereof I have signed my name to this specification, in the presence of two subscribing witnesses, on this 2d day of August, A. D. 1898.

CHARLES H. SHANNON.

Witnesses:
E. A. ALLEN,
EDWARD S. BEACH.